United States Patent
Kim et al.

(10) Patent No.: US 8,918,119 B2
(45) Date of Patent: Dec. 23, 2014

(54) APPARATUS AND METHOD FOR PROVIDING MAP SERVICE USING GLOBAL POSITIONING SERVICE IN A MOBILE TERMINAL

(75) Inventors: Nam-Hoon Kim, Suwon-si (KR); Sung Kwon, Anyang-si (KR); Young-Min Won, Suwon-si (KR); Woo-Jun Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 938 days.

(21) Appl. No.: 12/592,410

(22) Filed: Nov. 24, 2009

(65) Prior Publication Data

US 2010/0130235 A1    May 27, 2010

(30) Foreign Application Priority Data

Nov. 27, 2008 (KR) .................. 10-2008-0118687

(51) Int. Cl.
*H04W 64/00*    (2009.01)
(52) U.S. Cl.
CPC .................................... *H04W 64/00* (2013.01)
USPC ............... 455/456.3; 455/456.1; 455/456.2; 455/456.6; 455/466; 455/550.1

(58) Field of Classification Search
CPC ....... H04W 64/00; H04W 4/02; H04W 48/04; H04L 29/0857
USPC ................ 455/456.1–456.6, 466, 550.1, 565
See application file for complete search history.

(56) References Cited

U.S. PATENT DOCUMENTS

| | | | |
|---|---|---|---|
| 2006/0195255 A1* | 8/2006 | Kim | 701/208 |
| 2008/0045138 A1* | 2/2008 | Milic-Frayling et al. | 455/3.04 |
| 2008/0171555 A1* | 7/2008 | Oh et al. | 455/456.1 |
| 2009/0017870 A1* | 1/2009 | An | 455/565 |
| 2009/0098888 A1* | 4/2009 | Yoon | 455/456.2 |
| 2010/0029302 A1* | 2/2010 | Lee et al. | 455/456.6 |
| 2010/0125409 A1* | 5/2010 | Prehofer | 701/207 |

* cited by examiner

*Primary Examiner* — Michael T Vu

(57) ABSTRACT

An apparatus and method for providing a map service using a global positioning service in a mobile terminal includes determining a current position of the mobile terminal. A moving path of the mobile terminal is recorded. If content for key point marking are generated, a tag icon corresponding to the content is inserted into a point representing the current position of the mobile terminal. A map message includes the moving path, the tag icon, and the content.

16 Claims, 11 Drawing Sheets

APPARATUS AND METHOD FOR PROVIDING MAP SERVICE USING GLOBAL POSITIONING SERVICE IN A MOBILE TERMINAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Nov. 27, 2008 and assigned Serial No. 10-2008-0118687, the contents of which are herein incorporated by reference.

TECHNICAL FIELD OF THE INVENTION

The present invention relates to a mobile terminal. More particularly, the present invention relates to an apparatus and method for providing a map service using a Global Positioning Service (GPS) in a mobile terminal.

BACKGROUND OF THE INVENTION

In modern societies, a penetration rate of mobile terminals is rapidly increasing due to convenience and necessity and thus, the mobile terminals are now emerging as modern necessaries. Thus, service providers and terminal manufacturers are providing supplementary functions to increase the use of the mobile terminals. For example, the mobile terminals include supplementary functions such as a phone book, a game, a scheduler, a Short Message Service (SMS), a Multimedia Message Service (MMS), a cell broadcasting service, an Internet service, an electronic mail (e-mail), a morning call, Moving Picture Experts Group (MPEG) Layer 3 (MP3), a digital camera, a road guidance service, and so forth.

Among the above-listed various supplementary functions of the mobile terminals, generally, the road guidance service is realized using a built-in map and a Global Positioning System (GPS) function. That is, the road guidance service is provided in a way of displaying a position of a mobile terminal acquired through the GPS on the built-in map. Also, the road guidance service may include a function of displaying a moving path from a current position to a destination on a map. However, in order to display a position and a moving path on the map, it is necessary to store map information in a mobile terminal. That is, if the map information is not stored, the mobile terminal cannot display, although acquiring a current position through a GPS, a position of a destination and a moving path. Thus, if the map information is not stored, there is a problem of not being able to provide the road guidance service.

SUMMARY OF THE INVENTION

To address the above-discussed deficiencies of the prior art, it is a primary aspect of the present invention to provide an apparatus and method for providing a map service enabling road guidance without map information in a mobile terminal.

Another aspect of the present invention is to provide an apparatus and method for providing a map service marking a key point using at least one multimedia content in a mobile terminal.

A further aspect of the present invention is to provide an apparatus and method for providing a map service based on data generated by a user in a mobile terminal.

The above aspects are achieved by providing an apparatus and method for providing a map service using a global positioning service in a mobile terminal.

According to one aspect of the present invention, a method for generating a map in a mobile terminal is provided. The method includes determining a current position of the mobile terminal, recording a moving path of the mobile terminal, if content for key point marking is generated, inserting a tag icon corresponding to the content into a point representing the current position of the mobile terminal, and sending a map message including the moving path, the tag icon, and the content.

According to another aspect of the present invention, a method for providing a map service in a mobile terminal is provided. The method includes determining a current position of the mobile terminal, displaying a map extracted from a map message received from an opponent mobile terminal and the current position, if reaching a tag point positioned on a moving path displayed on the map, displaying a guide window of inquiring play or cancel of content corresponding to the tag point, and, if content play is selected by a user, executing the content.

According to a further aspect of the present invention, a mobile terminal apparatus for generating a map is provided. The apparatus includes a position module, a generator, and a communication unit. The position module determines a current position of the mobile terminal. The generator records a moving path of the mobile terminal and, if content for key point marking is generated, inserts a tag icon corresponding to the content into a point representing the current position of the mobile terminal. The communication unit sends a map message including the moving path, the tag icon, and the content.

According to a yet another aspect of the present invention, a mobile terminal apparatus configured to provide a map service is provided. The apparatus includes a position module, a display unit, and a controller. The position module determines a current position of the mobile terminal. The display unit displays a map extracted from a map message received from an opponent mobile terminal and the current position and, if reaching a tag point positioned on a moving path displayed on the map, displays a guide window of inquiring play or cancel of content corresponding to the tag point. If content play is selected by a user, the controller plays the content.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

Preferred embodiments of the present invention will be described herein below with reference to the accompanying drawings. In the following description, well-known functions or constructions are not described in detail since they would obscure the invention in unnecessary detail.

A technology for providing a map service enabling road guidance without map information in a mobile terminal according to an exemplary embodiment of the present invention is described below. In the following description, a mobile terminal means the inclusion of all user equipments used in a mobile communication system such as a cellular phone, a Personal Communication System (PCS), a Personal Data Assistant (PDA), an International Mobile Telecommunication—2000 (IMT2000) terminal, and the like.

Figure 1:
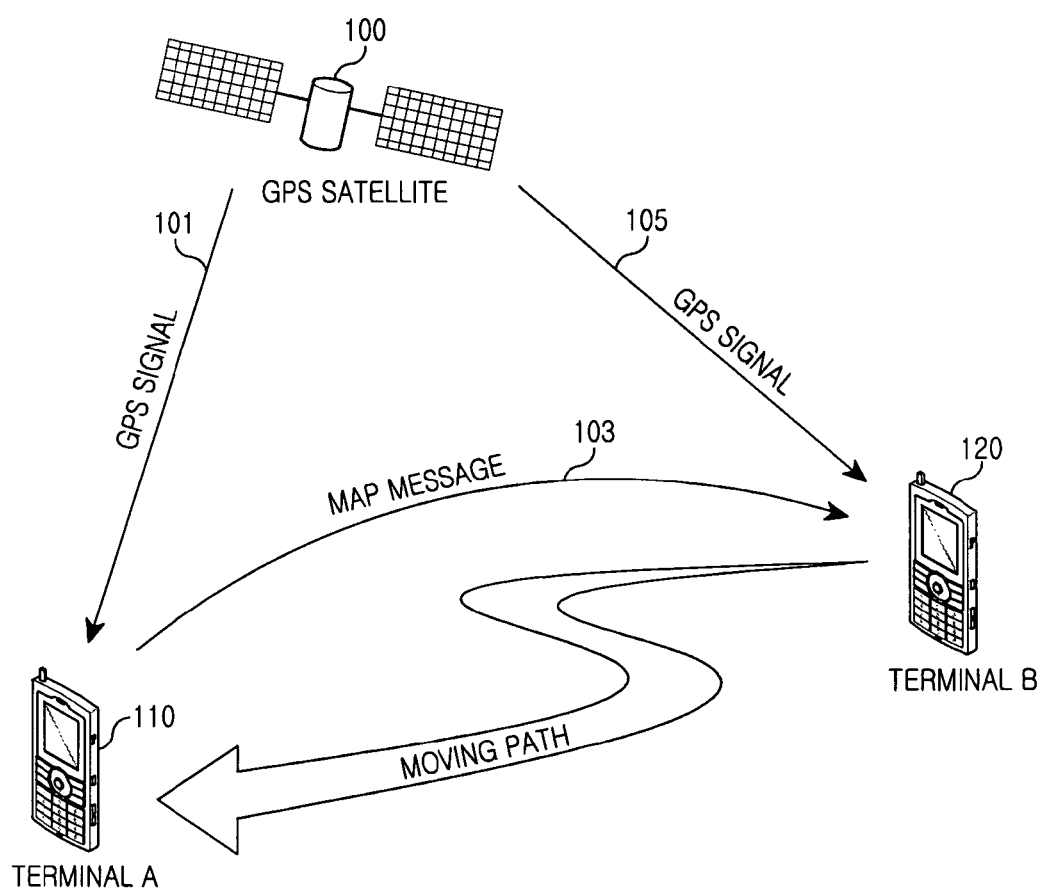
FIG. 1 illustrates a schematic diagram for a process of providing a map service in a mobile terminal according to the present invention.

FIG. 1 illustrates a schematic construction of a map service according to the present invention.

In FIG. 1, a terminal A 110 is a mobile terminal of a user who makes a map, and a terminal B 120 is a mobile terminal receiving the map made by the terminal A 110. The terminal A 110 and the terminal B 120 each include a Global Positioning Service (GPS) module, and can determine their own positions through a GPS.

A progress sequence of the map service is described. The terminal A 110 successively determines its own position using a GPS signal 101 received from a GPS satellite 100. At this time, the terminal A 110 records its own moving path using the determined position, and generates a map using the recorded moving path. If the map generating is completed, the terminal A 110 sends a map message 103 including the map to the terminal B 120. At this time, the map message is sent through a Short Message Service (SMS) or a Multimedia Message Service (MMS). Upon receiving the map message 103, the terminal B 120 determines its own position using a GPS signal 105 received from the GPS satellite 100. Additionally, the terminal B 120 provides a map service to a user using the map included in the map message 130 and the determined position.

An example of generating the map and providing the map service using the map according to an exemplary embodiment of the present invention is described below in detail with reference to the drawings.

Figure 2A:
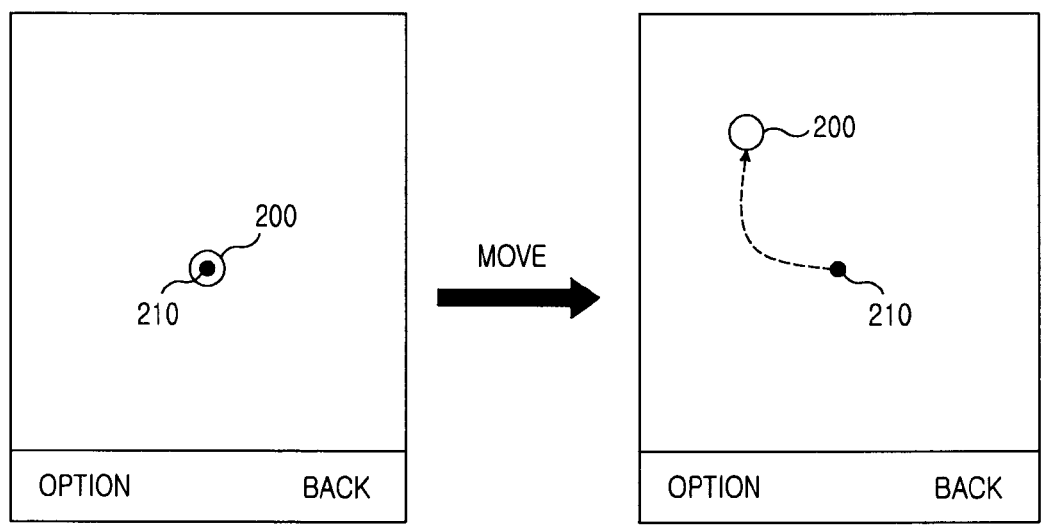
FIGS. 2A to 2C illustrate diagrams of an example of generating a map in a mobile terminal according to the present invention.
Figure 2B:
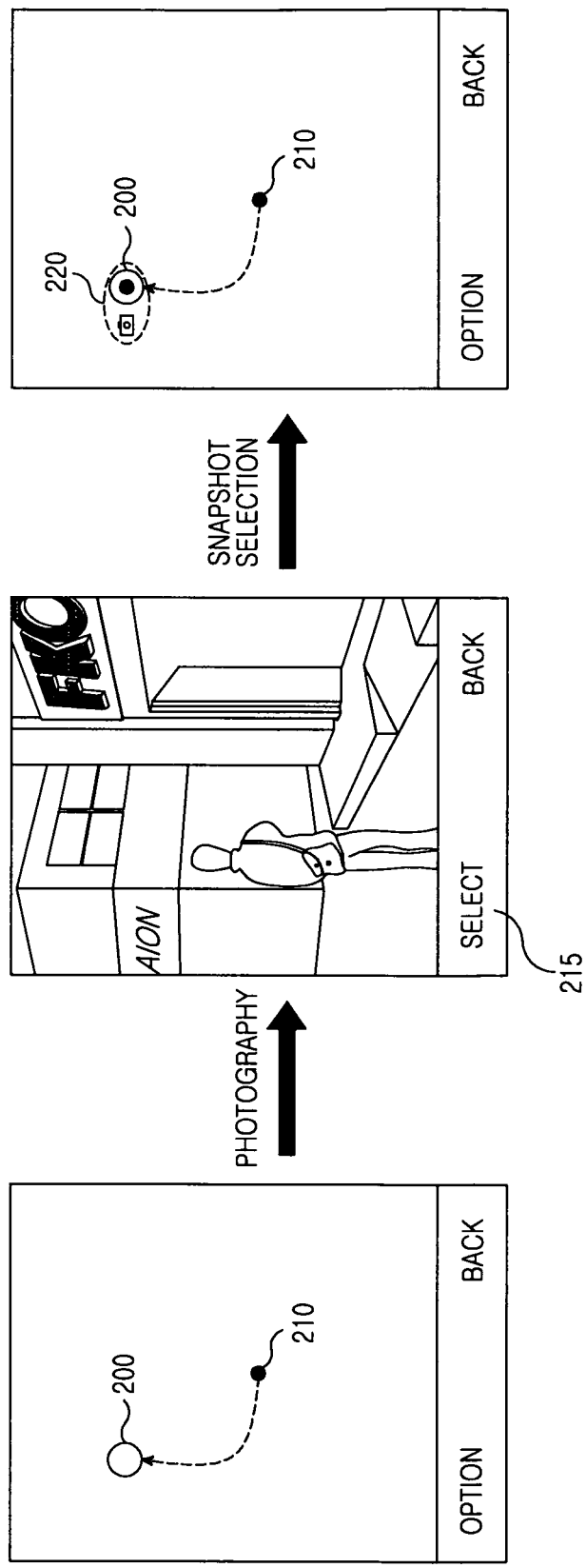
Figure 2C:
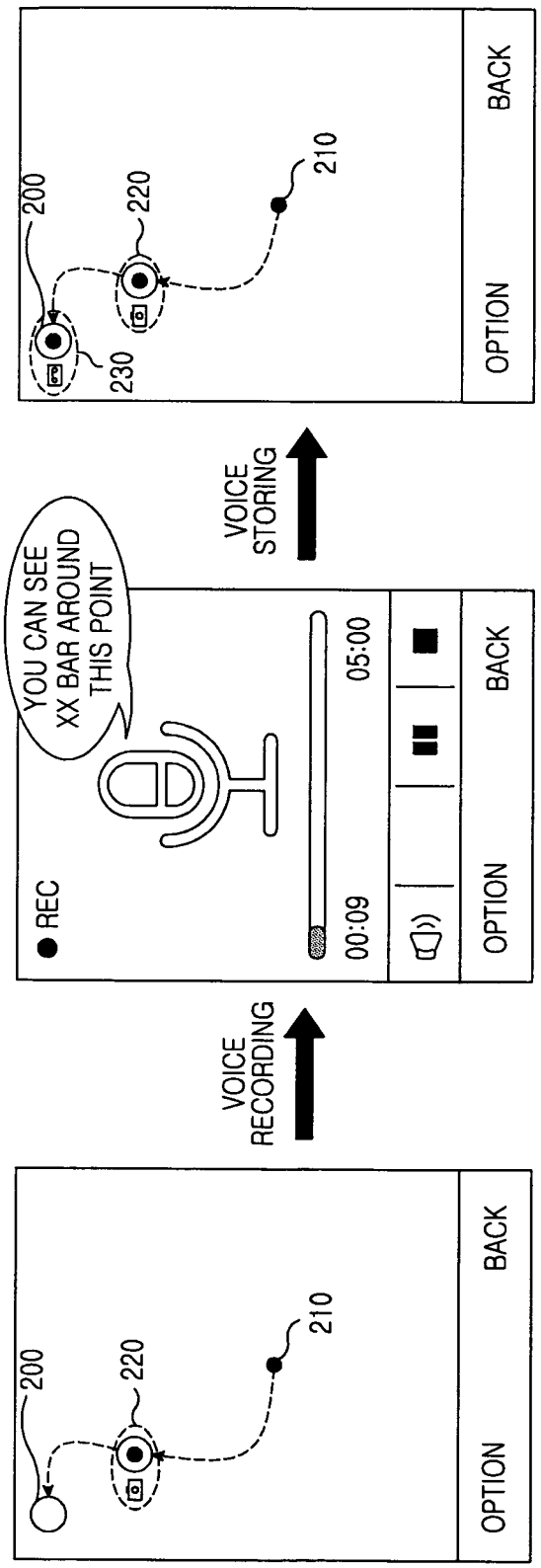

FIGS. 2A to 2C illustrate an example of generating a map in a mobile terminal according to the present invention.

Referring to FIG. 2A, if map generating starts, a mobile terminal determines a current position 200 through a GPS, and sets the current position 100 that is a map generation starting point, as a starting position 210. Further, the mobile terminal displays the current position 200 and the starting position 210 on a screen. During map generation, the starting position 210 does not change, and the current position 200 changes following a movement of the mobile terminal. Thus, if the current position change is recognized, the mobile terminal records a moving path of the current position 200, and displays the moving path on the screen. At this time, the map according to the present invention can further include the moving path illustrated in FIG. 2A and multimedia contents for marking key points illustrated in FIG. 2B and FIG. 2C.

Referring to FIG. 2B, if photography occurs by a user's manipulation in a state in which the current position 200, the starting position 210, and the moving path are displayed, the mobile terminal displays a photographed snapshot on the screen. At this time, the mobile terminal displays a 'select' button 215 for identifying snapshot selection or non-selection. If the 'select' button 215 is input by a user, that is, if the snapshot is selected, the mobile terminal inserts a snapshot icon 220 into a point representing the current position 200. Below, in the present invention, a 'tag point' denotes a position of generating the content for marking the key point. For example, as illustrated in FIG. 2B, the snapshot icon 220 can be comprised of a dot indicating a tag point and a figure indicating a snapshot.

Referring to FIG. 2C, if a voice record command occurs by a user's manipulation in a state where the current position 200, the starting position 210, and the moving path are displayed, the mobile terminal displays a voice record menu on the screen, and records a user's voice. Thereafter, if it is commanded to store the voice recorded by the user, the mobile terminal stores the recorded voice, and inserts a voice icon 230 into a point representing the current position 200. For example, as illustrated in FIG. 2C, the voice icon 230 can be comprised of a dot indicating a tag point and a figure indicating a voice.

That is, as in FIG. 2A to 2C, the map includes the current position 210, the starting point 210, the moving path, the tag icons 220 and 230, and multimedia contents corresponding to each tag.

Figure 3:
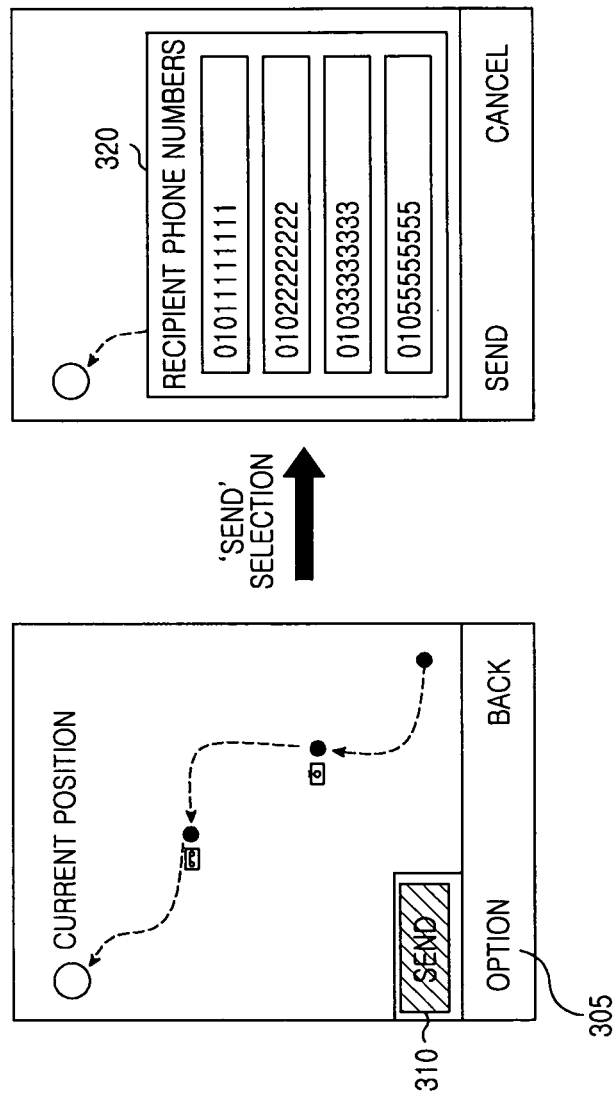
FIG. 3 illustrates a diagram of an example of sending a map in a mobile terminal according to the present invention.

FIG. 3 illustrates an example of sending a map in a mobile terminal according to the present invention.

Referring to FIG. 3, if an 'option' button 305 is input in the course of generating a map as in FIGS. 2A to 2C, the mobile terminal displays a menu 310 including a 'send' button. If the 'send' button is input by a user, the mobile terminal displays a phone number input window 320, and displays recipient phone numbers that are input by the user. After the recipient phone numbers are input, if a 'send' button is input, the mobile terminal generates a map message including the map, and sends the map message to mobile terminals corresponding to the recipient phone numbers, using an SMS or MMS.

Figure 4A:
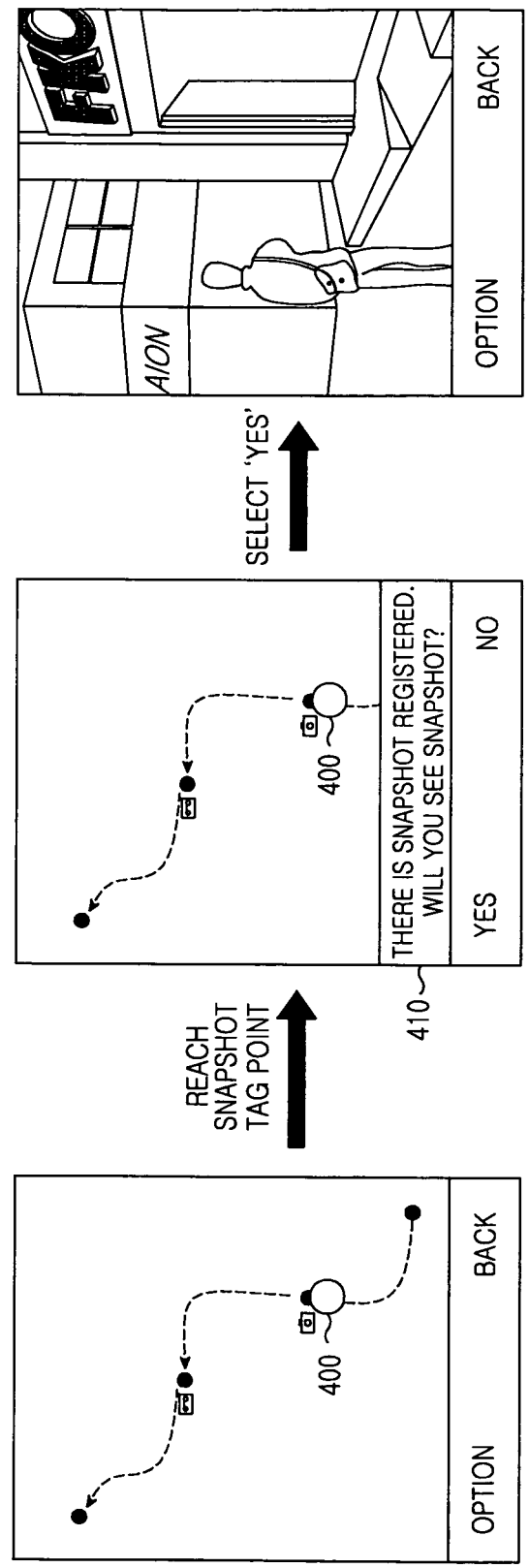
FIGS. 4A to 4C illustrate diagrams of an example of providing a map service using a map in a mobile terminal according to the present invention.
Figure 4B:
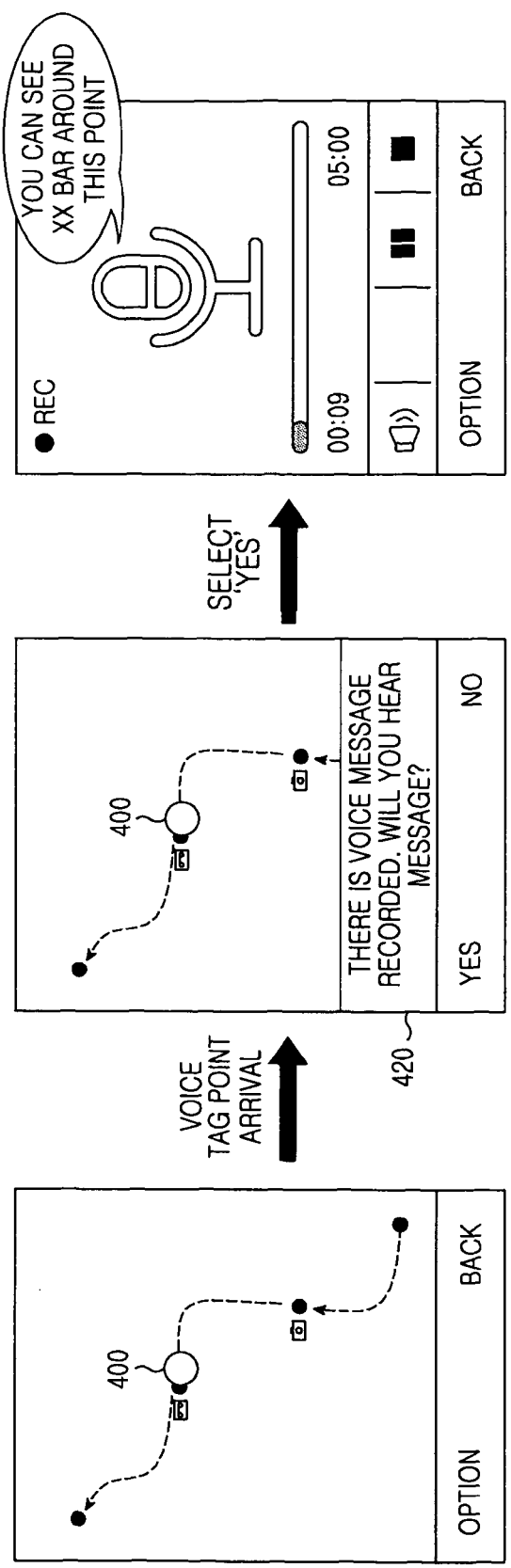
Figure 4C:
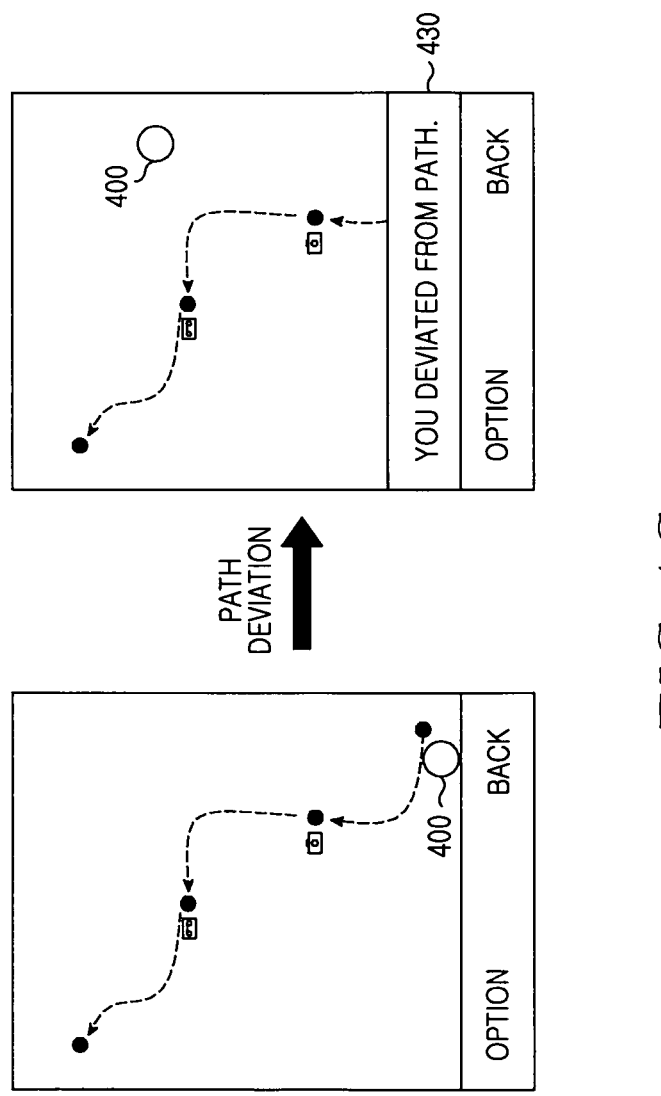

FIGS. 4A to 4C illustrate an example of providing a map service in a mobile terminal according to the present invention.

Referring to FIG. 4A, upon receiving a map message, the mobile terminal extracts a map from the map message and then, displays the map on a screen. At this time, the mobile terminal determines its own current position 400 through a GPS, and displays the current position 400 together with the map. As the mobile terminal moves, the mobile terminal moves the current position 400. If the current position 400 reaches a snapshot tag point in the course of moving the current position 400, the mobile terminal displays a guide window 410 of inquiring whether to display a snapshot file corresponding to the snapshot tag point. Accordingly, if a 'yes' button is input by a user, the mobile terminal displays the snapshot file on the screen. Thereafter, if a 'back' button is input by the user, the mobile terminal displays the map on the screen.

Referring to FIG. 4B also, if the current position 400 reaches a voice tag point in the course of moving the current position 400, the mobile terminal displays a guide window 420 of inquiring whether to play a voice file corresponding to the voice tag point. Accordingly, if the 'yes' button is input by a user, the mobile terminal displays a screen of playing a voice file, and plays the voice file. Thereafter, if the 'back' button is input by the user, the mobile terminal displays the map on the screen. Additionally, if the current position 400 reaches a destination, the mobile terminal generates an effect sound of informing destination arrival, and finishes road guidance.

Referring to FIG. 4C, in the course of providing the map service, it may occur that the current position 400 deviates from the moving path. If the current position 400 deviates from the moving path, the mobile terminal generates a warning sound of informing path deviation and at the same time, displays a guide window 430 of informing the path deviation.

A construction and operation of a mobile terminal for providing a map service according to an exemplary embodiment of the present invention are described below in detail with reference to the drawings.

Figure 5:
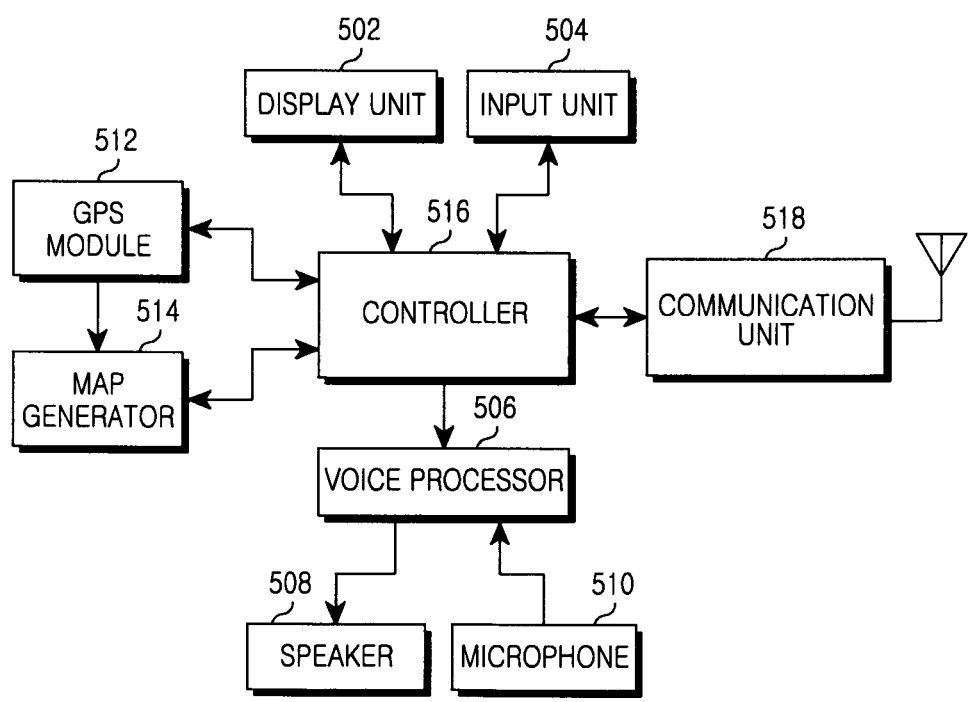
FIG. 5 illustrates a block diagram for a construction of a mobile terminal according to an exemplary embodiment of the present invention.

FIG. 5 illustrates a block diagram for a construction of a mobile terminal according to an exemplary embodiment of the present invention.

As illustrated in FIG. 5, the mobile terminal includes a display unit 502, an input unit 504, a voice processor 506, a speaker 508, a microphone 510, a GPS module 512, a map generator 514, a controller 516, and a communication unit 518.

The display unit 502 displays state information generated during an operation of .the mobile terminal, and numerals, characters, videos, and so forth, resulting from execution of an application program. In other words, the display unit 502 outputs video data provided from the controller 516 such that a user can visually recognize. For example, the display unit 502 can be comprised of a Liquid Crystal Display (LCD), an Organic Light-Emitting Diode (OLED), and the like. The input unit 504 recognizes an input generated by a user, and provides information corresponding to the input to the controller 516. For example, the input unit 504 generates data corresponding to a user's input based on a keyboard, a keypad, a touch screen, a touchpad, a special function button, and the like.

The voice processor 506 decodes voice data provided from the controller 516 into an electrical voice signal and provides the voice signal to the speaker 508. The voice processor 506 encodes an electrical voice signal provided from the microphone 510 into voice data. The speaker 508 is a voice output device, and converts an electrical voice signal provided from the voice processor 506 into a physical voice signal that can be heard by the user. The microphone 510 converts a user's voice into an electrical signal and provides the electrical signal to the voice processor 506.

The GPS module 512 determines a position of the mobile terminal using a GPS signal received from a GPS satellite. The GPS module 512 is enabled and disabled by the control of the controller 516 and, upon enabling, determines the position. Additionally, the GPS module 512 provides position information to the controller 516 and the map generator 514.

The map generator 514 generates a map. In other words, the map generator 514 generates a map using the position information provided from the GPS module 512 and tag information provided from the controller 516. That is, the map generator 514 records a moving path using the position information, and inserts a tag icon for key point marking on the moving path using the tag information. In other words, the map generator 514 inserts the tag icon into a point representing a current position of the mobile terminal. For example, as illustrated in FIGS. 2B and 2C, the tag icon is comprised of a dot indicating a tag point and a figure indicating the kind of corresponding content.

The controller 516 controls a general function of the mobile terminal. Particularly, according to the present invention, the controller 516 controls a function of generating a map and sending a map message or a function of providing a map service using a received map message. The following description is made dividing into a case of generating the map and a case of providing the map service.

The case of generating the map is described below. The controller 516 drives the GPS module 512, and controls the GPS module 512 to provide position information to the map generator 514. Also, if a tag insert event occurs during map generating of the map generator 514, that is, if content for key point marking on the moving path are generated, the controller 516 stores the content corresponding to a tag, and provides tag information to the map generator 514. For example, as in FIG. 2B, the content can be equal to a snapshot, and a snapshot tag is inserted by user's taking a snapshot during the moving path recording and selecting the snapshot taken by a user. Also, as in FIG. 2C, the content can be equal to a voice, and a voice tag is inserted by user's recording a voice during the moving path recording and storing and selecting the voice recorded by the user. Also, if a 'send' menu is selected during map generating of the map generator 514, the controller 516 displays a recipient phone number input window through the display unit 502, and identifies if a send command for a map message occurs. If the send command occurs, the controller 516 generates a map message including a map made by the map generator 514, and sends the map message to mobile terminals corresponding to recipient phone numbers that are input through the communication unit 518. At this time, the map message is sent using an SMS or MMS.

The case of providing the map service is described below. The controller 516 drives the GPS module 512. Additionally, the controller 516 extracts a map from a received map message, displays the map through the display unit 502 and, together with the map, displays the position information provided from the GPS module 512. If the mobile terminal reaches a tag point in the course of displaying the map and the position information, the controller 516 displays a guide window of inquiring contents play or cancel through the display unit 502. Here, the tag point exists on the moving path displayed on the map, and is marked as a tag icon. Reaching or non-reaching the tag point is determined by at least one of a marked position of the tag icon, position information on the tag point, a displayed position of a current position, and position information on the current position. That is, if a distance difference between a position provided from the GPS module 512 and the tag point is less than a threshold value, the controller 516 determines that the mobile terminal reaches the tag point. After displaying the guide window of inquiring the contents play or cancel, if content play is selected by a user, the controller 516 plays the content. For example, if the content is equal to a snapshot, the controller 516 displays a snapshot file corresponding to the snapshot tag point. If the content is equal to a voice, the controller 516 plays a voice file corresponding to the voice tag point. Also, if the position provided from the GPS module 512 deviates from the moving path, the controller 516 displays a guide window of informing path deviation through the display unit 502, and generates a warning sound through the speaker 508. Also, if a distance between the position provided from the GPS module 512 and a destination is less than a threshold value, the controller 516 generates an effect sound of informing destination arrival through the speaker 508, and finishes road guidance.

The communication unit 518 provides an interface for performing communication over a wireless channel. That is, the communication unit 518 performs mutual conversion between information data and a transmission/reception signal in pursuance of a standard of a system. Particularly, if the mobile terminal operates as a road guidance sender, the communication unit 518 converts a map message provided from the controller 516 into a physical Radio Frequency (RF) signal, and transmits the RF signal through an antenna. Also, if the mobile terminal operates as a road guidance receiver, the communication unit 518 restores a bit stream of a map message from an RF signal received through the antenna and provides the bit stream to the controller 516.

Figure 6:
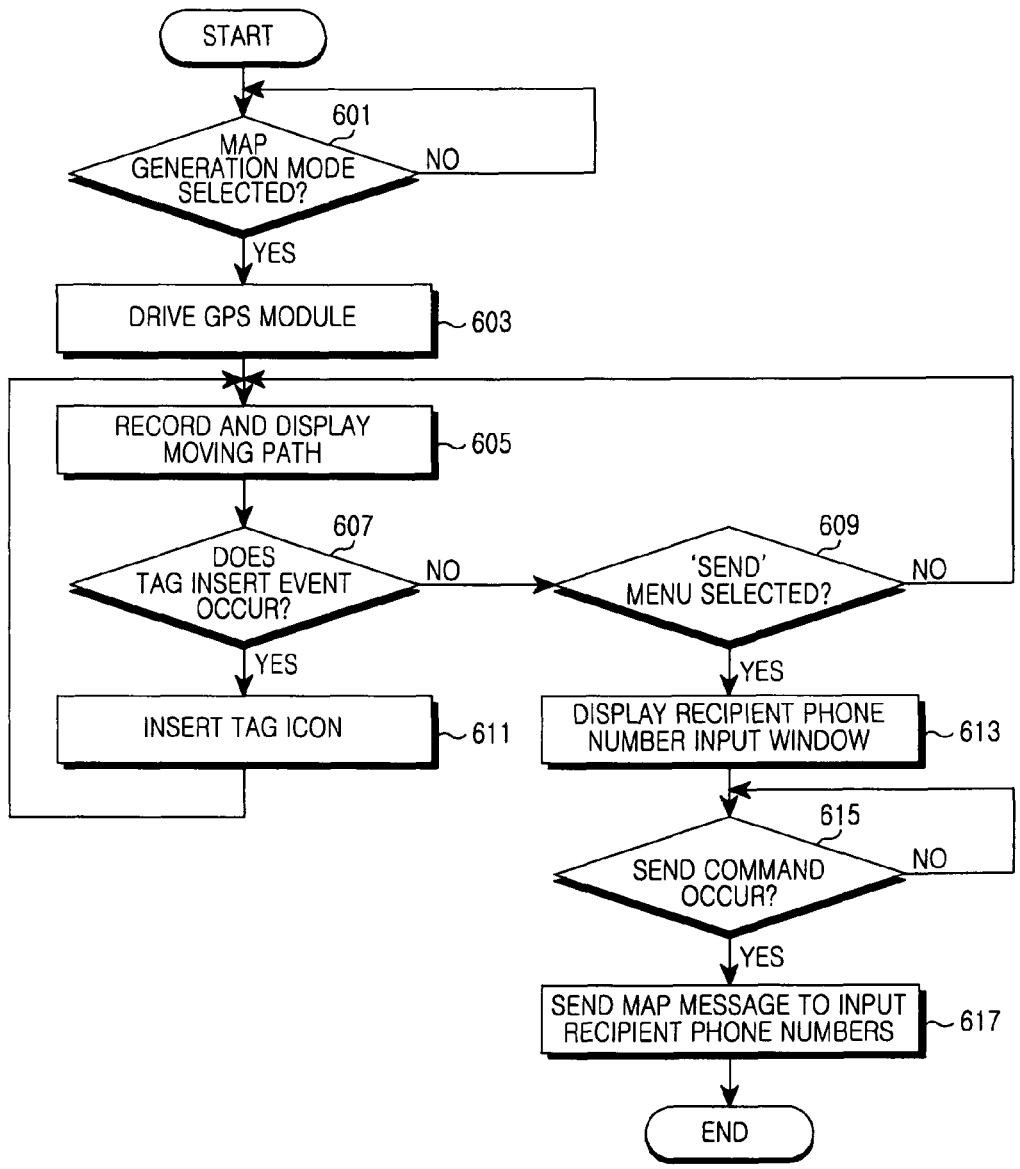
FIG. 6 illustrates a flow diagram for a procedure of sending a map message in a mobile terminal according to an exemplary embodiment of the present invention.

FIG. 6 illustrates a procedure of sending a map message in a mobile terminal according to an exemplary embodiment of the present invention.

Referring to FIG. 6, in step 601, the mobile terminal identifies if a map generating mode is selected. That is, the mobile terminal identifies if it converts into a mode for map generating by a user's manipulation.

If the map generating mode is selected, the mobile terminal proceeds to step 603 and drives a GPS module. That is, by enabling an operation of the GPS module, the mobile terminal successively receives a GPS signal from a GPS satellite until the end of the procedure according to an exemplary embodiment of the present invention, and successively determines a position of the mobile terminal using the GPS signal.

After driving the GPS module, the mobile terminal proceeds to step 605 and records a moving path using the position information determined through the GPS, displaying the moving path on a screen. For example, as in FIG. 2A, the mobile terminal displays a starting position, a moving path, and a current position.

Then, the mobile terminal proceeds to step 607 and identifies if a tag insert event occurs. In other words, the mobile terminal identifies if contents for key point marking on the moving path are generated. For example, as in FIG. 2B, the contents can be equal to a snapshot, and a snapshot tag is inserted by user's taking a snapshot during the moving path recording and selecting the snapshot taken by a user. Alternatively, as in FIG. 2C, the contents can be equal to a voice, and a voice tag is inserted by user's recording a voice during the moving path recording and storing and selecting the voice recorded by the user.

If the tag insert event does not occur, the mobile terminal proceeds to step 609 and identifies if a 'send' menu is selected. That is, the mobile terminal displays a menu resulting from an 'option' button input by the user, and identifies if a 'send' item among the menu is input. If the 'send' menu is not selected, the mobile terminal returns to step 605. That is, the mobile terminal repeats steps 603 to 609 and identifies if a tag insert event occurs or a 'send' menu is selected.

If the tag insert event occurs in step 607, the mobile terminal proceeds to step 611 and inserts a tag icon. In other words, the mobile terminal inserts the tag icon into a point representing a current position of the mobile terminal. For example, as illustrated in FIGS. 2B and 2C, the tag icon is comprised of a dot indicating a tag point and a figure indicating the kind of contents.

If the 'send' menu is selected in step 609, the mobile terminal proceeds to step 613 and displays a recipient phone number input window. That is, the mobile terminal stops map generating, and displays a window for inputting phone numbers of mobile terminals to receive a map message. At this time, the mobile terminal displays recipient phone numbers input by the user, on the screen.

Then, the mobile terminal proceeds to step 615 and identifies if a send command occurs. In other words, the mobile terminal identifies if a 'send' button is input in the recipient phone number input window.

If the send command occurs, the mobile terminal proceeds to step 617 and sends a map message to mobile terminals corresponding to the input recipient phone numbers. That is, the mobile terminal generates the map message including a map, and sends the map message to the mobile terminals corresponding to the recipient phone numbers using an SMS or MMS.

Figure 7:
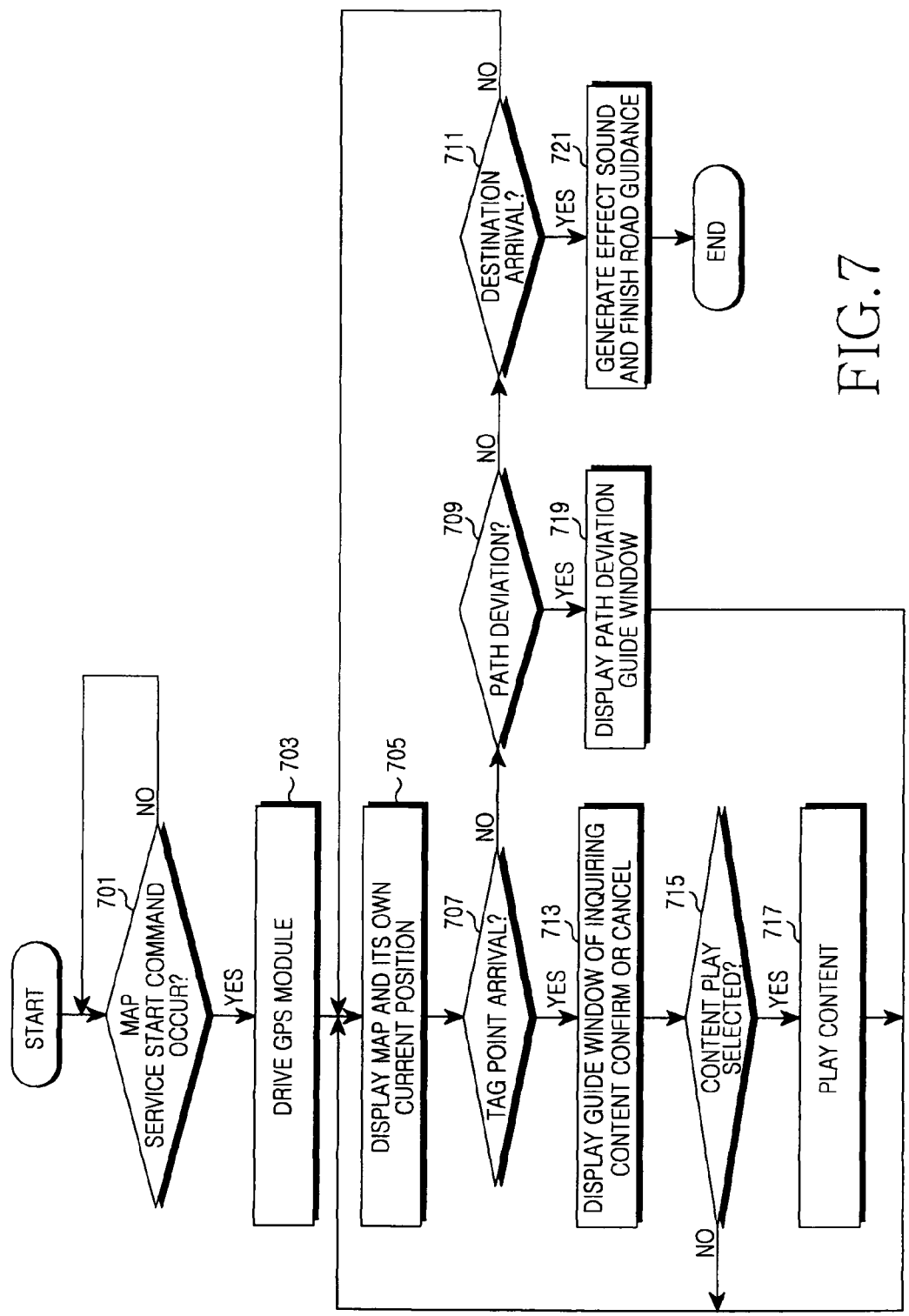
FIG. 7 illustrates a flow diagram for a procedure of providing a map service in a mobile terminal according to an exemplar embodiment of the present invention.

FIG. 7 illustrates a procedure of providing a map service in a mobile terminal according to an exemplary embodiment of the present invention.

Referring to FIG. 7, in step 701, the mobile terminal identifies if a map service start command occurs. That is, the mobile terminal identifies if it converts into a map service mode by a user's manipulation. At this time, if it is set that a map service automatically starts at the time of receiving a map message following an intention of an executor of the present invention, the mobile terminal automatically initiates the map service at the time of receiving the map message.

If the map service start command occurs, the mobile terminal proceeds to step 703 and drives a GPS module. That is, by enabling an operation of the GPS module, the mobile terminal successively receives a GPS signal from a GPS satellite until the end of the procedure according to an exemplary embodiment of the present invention, and successively determines a position of the mobile terminal using the GPS signal.

After driving the GPS module, the mobile terminal proceeds to step 705 and displays a map included in the map message and its own current position on a screen. That is, the mobile terminal extracts the map from the map message, displays a moving path included in the map, and then, together with the moving path, displays position information determined through the GPS. Thus, the mobile terminal successively displays a current position that moves depending on varying position information.

Then, the mobile terminal proceeds to step 707 and identifies if it reaches a tag point. The tag point exists on the moving path displayed on the map, and is marked as a tag icon along with the moving path. Reaching or non-reaching the tag point is determined by at least one of a marked position of the tag icon, position information on the tag point, a displayed position of a current position, and position information on the current position. That is, if a distance difference between a current position and the tag point is less than a threshold value, the mobile terminal determines that it reaches the tag point.

If not reaching the tag point, the mobile terminal proceeds to step 709 and identifies if it deviates from the moving path. That is, the mobile terminal compares a moving path of a sender with a current position of the mobile terminal and, if a distance difference between the moving path and the current position exceeds a threshold value, the mobile terminal determines that it deviates from the moving path.

If not deviating from the moving path, the mobile terminal proceeds to step 711 and identifies if it reaches a destination. In other words, if a distance difference between the current position and the destination is less than a threshold value, the mobile terminal determines that it reaches the destination. If not reaching the destination, the mobile terminal returns to step 705. That is, the mobile terminal repeats steps 705 to 711 and identifies if it reaches a tag point, deviates from a path, or reaches a destination.

If reaching the tag point in step 707, the mobile terminal proceeds to step 713 and displays a guide window of inquiring play or cancel of content corresponding to the tag point. For example, the content can be equal to a snapshot or voice and, as in FIG. 2B or FIG. 2C, the mobile terminal displays a guide window of inquiring content play or cancel.

After displaying the guide window, the mobile terminal proceeds to step 715 and identifies if content play is selected by a user. In other words, the mobile terminal identifies if a 'yes' button is input by the user. If the content play is not selected, that is, if a 'no' button is input, the mobile terminal returns to step 705.

Alternatively, if the contents play is selected, the mobile terminal proceeds to step 717 and plays the content. For example, if the content is equal to a snapshot, the mobile terminal displays a snapshot file corresponding to the tag point. If the content is equal to a voice, the mobile terminal plays a voice file corresponding to the tag point. Then, the mobile terminal returns to step 705.

If deviating from the moving path in step 709, the mobile terminal proceeds to step 719 and displays a guide window of informing path deviation, generating a warning sound. For example, as in FIG. 4C, the mobile terminal displays a guide window of informing path deviation. Then, the mobile terminal returns to step 705.

If reaching the destination in step 711, the mobile terminal proceeds to step 721 and generates an effect sound of informing destination arrival, finishing road guidance.

An exemplary embodiment of the present invention can provide a very efficient road guidance service to map message recipients by providing a map service using a map message including moving path information generated by a user and multimedia contents in a mobile terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for generating a map in a mobile terminal, the method comprising:
   determining a current position of the mobile terminal;
   recording a moving path of the mobile terminal;
   when content for key point marking is generated during the recording of the moving path,
   inserting a tag icon corresponding to the content into a point representing the current position of the mobile terminal; and
   sending a map message to a second mobile terminal, the map message configured to enable a map comprising the moving path, the tag icon, the content, and a current location of the second mobile terminal,
   wherein the content comprises at least one of a snapshot and a voice, and
   wherein the tag icon comprises at least one of a dot indicating a tag point and a figure indicating a content kind.

2. The method of claim 1, wherein the current position is determined using Global Positioning Service (GPS) signals.

3. The method of claim 1, further comprising:
   if a map send command occurs during the moving path recording, displaying a recipient phone number input window; and
   sending the map message to a mobile terminal corresponding to at least one phone number that is input to the input window.

4. The method of claim 3, wherein the map message is sent using one of a Short Message Service (SMS) and a Multimedia Message Service (MMS).

5. A method for providing a map service in a mobile terminal, the method comprising:
   determining a current position of the mobile terminal;
   displaying a map extracted from a map message received from an opponent mobile terminal and the current position of the mobile terminal, wherein the map message comprises a moving path of the opponent mobile terminal, at least one tag icon, and at least one content;
   displaying a guide window configured to inquire whether to play or cancel content corresponding to a tag point when the mobile terminal reaches the tag point positioned on a moving path displayed on the map; and
   if content play is selected by a user, executing the content,
   wherein the content comprises at least one of a snapshot and a voice, and
   wherein the tag icon comprises at least one of a dot indicating a tag point and a figure indicating a content kind.

6. The method of claim 5, wherein the current position is determined using a Global Positioning Service (GPS) signal.

7. The method of claim 5, further comprising, if the current position deviates from the moving path, displaying a guide window configured to inform of the path deviation.

8. The method of claim 5, wherein the map message is sent using one of a Short Message Service (SMS) and a Multimedia Message Service (MMS).

9. A mobile terminal apparatus for generating a map, the apparatus comprising:
   a position module configured to determine a current position of the mobile terminal;
   a generator configured to record a moving path of the mobile terminal and configured to insert a tag icon corresponding to a content for key point marking into a point representing the current position of the mobile terminal when the content for key point marking is generated during the recording of the moving path; and
   a communication unit configured to send a map message to a second mobile terminal, the map message configured to enable a map comprising the moving path, the tag icon, the content, and a current location of the second mobile terminal, wherein the content comprises at least one of a snapshot and a voice, and wherein the tag icon comprises at least one of a dot indicating a tag point and a figure indicating a content kind.

10. The apparatus of claim 9, wherein the position module is configured to determine the current position using Global Positioning Service (GPS) signals.

11. The apparatus of claim 9, wherein, if a map send command occurs during the moving path recording, the controller is configured to display a recipient phone number input window, and wherein the communication unit is configured to send the map message to a mobile terminal corresponding to at least one phone number that is input to the input window.

12. The apparatus of claim 11, wherein the map message is sent using one of a Short Message Service (SMS) and a Multimedia Message Service (MMS).

13. A mobile terminal apparatus for providing a map service, the apparatus comprising:

a position module configured to determine a current position of the mobile terminal;

a display unit configured to display a map extracted from a map message received from an opponent mobile terminal and the current position of the mobile terminal, and configured to display a guide window configured to inquire whether to play or cancel content corresponding to a tag point when the mobile terminal reaches the tag point positioned on a moving path displayed on the map; and a controller configured to execute the content if contents play is selected by a user, wherein the map message comprises the moving path of the opponent mobile terminal, at least one tag icon, and at least one content, wherein the content comprises at least one of a snapshot and a voice, and wherein the tag icon comprises at least one of a dot indicating a tag point and a figure indicating a content kind.

14. The apparatus of claim 13, wherein the position module is configured to determine the current position using Global Positioning Service (GPS) signals.

15. The apparatus of claim 13, wherein, if the current position deviates from the moving path, the display unit is configured to display a guide window of informing path deviation.

16. The apparatus of claim 13, wherein the map message is sent using one of a Short Message Service (SMS) and a Multimedia Message Service (MMS).

\* \* \* \* \*